United States Patent [19]

Braeger

[11] Patent Number: 4,726,094
[45] Date of Patent: Feb. 23, 1988

[54] APPARATUS FOR THE AUTOMATIC CUTTING UP OR DIVIDING UP OF FISH FILLETS

[75] Inventor: Horst Braeger, Lubeck, Fed. Rep. of Germany

[73] Assignee: Nordischer Maschinenbau Rud. Baader GmbH & Co., Lubeck, Fed. Rep. of Germany

[21] Appl. No.: 68,956

[22] Filed: Jul. 1, 1987

[30] Foreign Application Priority Data

Jul. 9, 1986 [DE] Fed. Rep. of Germany ....... 3623002

[51] Int. Cl.⁴ .............................................. A22C 25/18
[52] U.S. Cl. ............................................. 17/54; 17/61
[58] Field of Search ......................... 17/54, 61, 52, 1 R

[56] References Cited

U.S. PATENT DOCUMENTS 4,557,019 12/1985 Van Devanter et al. .......... 17/54 X
4,601,083 7/1986 Shoji et al. ............................... 17/54
4,662,029 5/1987 Helsene et al. .......................... 17/52

Primary Examiner—Willie G. Abercrombie
Attorney, Agent, or Firm—Thomas R. Morrison

[57] ABSTRACT

The invention aims at improving an apparatus for dividing fillets into portions, such as, for example, tails, loins and possibly center pieces by effecting the necessary dividing cuts while simultaneously and automatically safe-guarding an adaptation to the particular fillet dimensions or other optically striking features. To this end, a cutting mechanism arranged above a fillet supplying conveying surface and constituted by at least one cutting member is suggested, whose circular knife has a flattened portion, which, when facing the conveying surface, offers a passage position of the circular knife and by a well defined rotation makes it possible to bring the knife into the cutting position. The cutting members are controlled by computing the dimensions and/or optically striking features of a fillet image obtained by means of a video camera and supplied to a computer.

20 Claims, 4 Drawing Figures

APPARATUS FOR THE AUTOMATIC CUTTING UP OR DIVIDING UP OF FISH FILLETS

BACKGROUND OF THE INVENTION

1. Field of the Invention

The present invention relates to an apparatus for the automatic cutting up or dividing of fish fillets, from which preferably the pinbones and/or belly flaps have been removed, for the purpose of gaining (commercially) useable pieces defined by essentially parallel cut edges, such as, for example, the tail part or a portion thereof, constituting so-called tails, as well as so-called loins extending from the front end to the tail part and including the dorsal muscle, the apparatus essentially comprising a conveying device driven in a revolving manner which conveys the fillets in a position lying flat and substantially perpendicular to their longitudinal axis; a cutting mechanism positioned above its conveying surface; and an electronic camera system for detecting an image of the fish and for the imagedependent control of the cutting mechanism.

2. Prior Art

U.S. Pat. No. 4,557,019 discloses an apparatus for automatically dividing up fish fillets into portions, in which the fish fillets are applied to a conveyor belt with the longitudinal axis thereof aligned in the conveying direction and the dividing cuts are made at right angles to said conveying direction. The cutting mechanism is controlled by an electronic image scanning system, which detects and scans the shape of the fillet to be divided, effects a weight determination by computing and, on the basis thereof, activates the cutting mechanism, whilst taking account of the advance speed of the fillets and the desired portions.

It is a disadvantage of this known apparatus that it is not possible to integrate it into an automatic filleting line with a presently common throughput capacity due to the system-based, comparatively low working speed. In addition, the known apparatus does not ensure a complete division or separation of the fillet portions reliably, because it is unavoidable, for this purpose, that the dividing or cutting knife is inserted in the bearing surface, whilst using the same as a cutting abutment or support.

Norwegian patent No. 78 432 discloses a cutting mechanism for producing "fork morsels" from fish fillets. This apparatus utilizes thin, juxtaposed knife blades, which are constructed so as to be lowerable onto the fillets placed transversally on the conveyor and supplied by the latter with the same rhythm as said operation and effects a division by drawing cuts. The actual division takes place at a fixed spacing, i.e. by producing portions of uniform length and with all the knife blades operating in a manner which cannot be influenced or controlled.

3. Objects of the Invention

It is the major object of the present invention to suggest an apparatus which can be integrated into a modern filleting line. It is a further essential object of the invention to suggest an apparatus with the aid of which it is possible to divide or cut up fish fillets supplied in close succession and which are unsorted as regards their sizes in accordance with predeterminable, e.g. configuration-dependent criteria.

SUMMARY OF THE INVENTION

In an apparatus essentially comprising a conveying device driven in a revolving manner which conveys the fillets in a position lying flat and substantially perpendicular to their longitudinal axis; a cutting mechanism positioned above its conveying surface; and an electronic camera system for detecting an image of the fish and for the imagedependent control of the cutting mechanism, these problems are solved, according to the present invention, in that the cutting mechanism includes cutting members in the form of circular knives, whose cutting planes are aligned parallel to the advance movement of the conveying device, the circular knives being at least partly controllable with respect to their operating and cutting positions in dependency on the size of the fillets and/or striking optical features and that the controllable circular knives are designed such that their circumferential cutting edges are interrupted, e.g. by removing a circle segment, whose height of arc corresponds at least to the greatest thickness of the largest fillet to be processed.

Preferably, all the cutting members can revolve about a common axis.

The individual controllability can be achieved expediently in that at least part of the controllable cutting members are provided with a rotary drive for influencing the operating position of the circular knives and at least partially with a setting drive for setting the cutting position thereof. Preferably, both each setting drive and each rotary drive can be constructed as a stepping motor, whereby it is made possible to derive the control for the cutting members from a fillet image detection.

The setting of the cutting position of the cutting members can take place with the total length of the respective fillet serving as setting parameter, the fillets preferably being conveyed with a unitary alignment or orientation of their tail end. If desired, however, the setting of the cutting position of at least the cutting member making the loin cut can well be oriented by way of the end of the cut used for removing the pinbones and/or belly flaps.

In order to ensure a complete severing of the fillet parts, the conveying surface of the conveying device can be provided with longitudinal grooves, into which the circumferential cutting edges of the circular knives immerse, the setting of the cutting position of the cutting members taking place taking account of the position of the longitudinal grooves in the conveying surface of the conveying device.

BRIEF DESCRIPTION OF THE DRAWINGS

Other and further objects of the present invention will be apparent from the following description and claims and are illustrated in the accompanying drawings, which by way of illustration schematically show preferred embodiments of the present invention and the principles thereof and what now are considered to be the best modes contemplated for applying these principles. Other embodiments of the invention embodying the same or equivalent principles may be used and structural changes may be made as desired by those skilled in the art without departing from the present invention and the scope of the appended claims. In the drawings

DETAILED DESCRIPTION OF THE PREFERRED EMBODIMENTS

Figure 1:
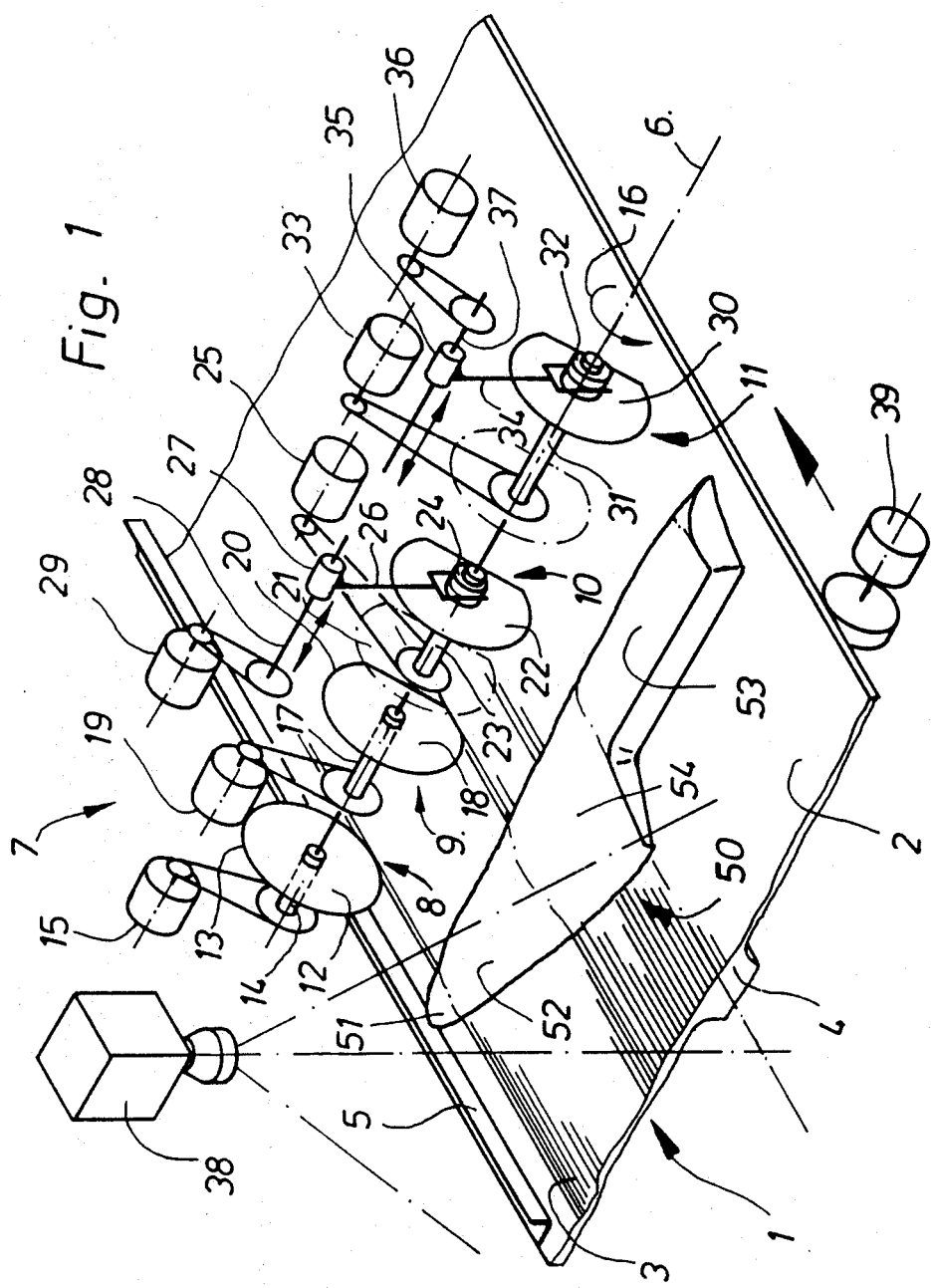
FIG. 1 shows an overall view of the cutting mechanism in a simplified, axonometric representation.

In a frame, which is not shown in detail, is located a conveying device 1, which comprises an endlessly revolving conveying belt continuously driven in a suitable manner, whose conveying surface 2 is provided over its entire width with fine longitudinal grooves 3 running parallel to the conveying direction (indicated by an arrow to the right of FIG. 1) and whose underface has at least one wedge or spline profile 4 for a reliable track maintenance. In the vicinity of a lateral edge the conveying surface 2 is limited by means of an abutment rail or bar 5. A preferably frame-fixed axle 6 aligned perpendicularly to the conveying direction and parallel to the conveying plane is located above the conveying surface 2. This axle 6 carries a cutting mechanism 7, which comprises a plurality of cutting members 8 to 11, which are distributed over the width of the conveying surface 2. A first cutting member 8 is located in the vicinity of the abutment rail 5 and comprises a circular knife 12, which is fixed to a sleeve 14 appropriately secured against axial movement, which is driven in a rotary manner in an appropriate way in the direction of arrow 16 by a conventional motor 15 and whose circumferential cutting edge 13 immerses into one of the longitudinal grooves 3 in the conveying surface 2. In the direction of the axle 6, the cutting member 8 is followed by a second cutting member 9 with a circular knife 18, which is fixed on an independently driven sleeve 17, whose axial displacement is also prevented. The drive is in the form of a rotary drive 19, preferably constructed as a stepping motor. Circular knife 18 has a circumferential cutting edge 20 interrupted over part of its circumference by removing a portion of the circular disk in the form of a circle segment 21. The second cutting member 9 is followed by a third cutting member 10 with a circular knife 22 designed in the same manner as circular knife 18. Circular knife 22 is fixed to a multisplined sliding sleeve 24, which is in turn displaceably mounted on an axially secured sleeve 22, which is driven by means of a rotary drive 25 in the form of a stepping motor. A fork-like setting member 26 engages sleeve 24 and is connected to a nut 27, which is received by a threaded spindle 28 parallel to axle 6 and driven in an appropriate manner by means of a setting drive 29 in the form of a stepping motor. Adjacent to cutting member 10 is provided a fourth, similar cutting member 11 on the axle 6, reference numeral 30 being associated to a circular knife designed as knives 18 and 22, 32 to a multisplined sliding sleeve, 31 to a sleeve 31, 33 to a rotary drive, 34 to a setting element, 35 to a nut, 36 to a setting drive and 37 to a threaded spindle. The arrangement of circular knives 18, 22 and 30 is such that their circumferential cutting edges are immersed in longitudinal grooves 3 in conveying surface 2, respectively. The apparatus is further equipped with a video camera 38, which monitors the conveying surface 2 illuminated by means of suitable, not shown illuminating means. The video camera, like an incremental angle generator 39 revolving synchronously with the conveying surface 2, forms part of a control circuit, whose block circuit diagram will be described hereinafter.

The control circuit has a central computer 40, to which are supplied, by means of a control unit 41, the signals from the video camera 38. Synchronization with the speed of conveying surface 2 takes place by means of the incremental angle generator 39 revolving therewith. Furthermore, monitoring signals pass into and influence the function of the computer 40 and are supplied by a monitoring member 42 controlling the degree of illumination of the field of view of the video camera 38. From the signals prepared by the computer 40, in accordance with a given programme, are generated the control signals for the drives of the cutting members 9, 10 and 11, whose positions are monitored by position control elements 43 to 47.

Figures 2, 3:
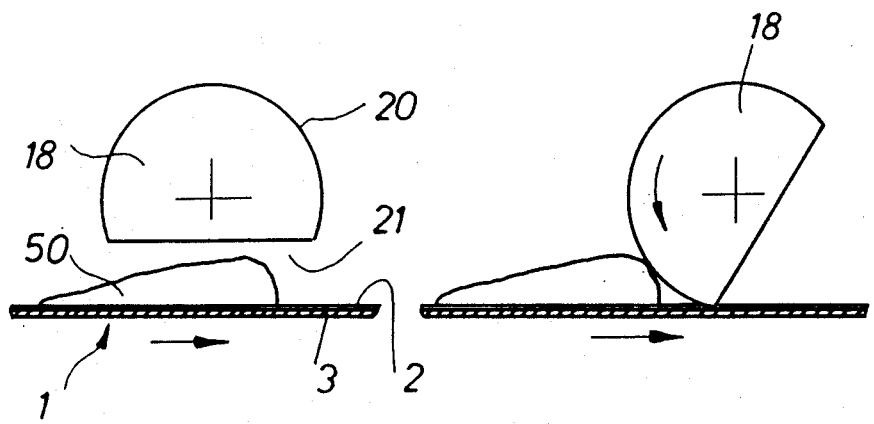
FIG. 2 shows a partial cross-section through the apparatus with a circular knife in the inoperative position.
FIG. 3 shows a partial cross-section corresponding to FIG. 2 with a circular knife in a position ready for cutting.
Figure 4:
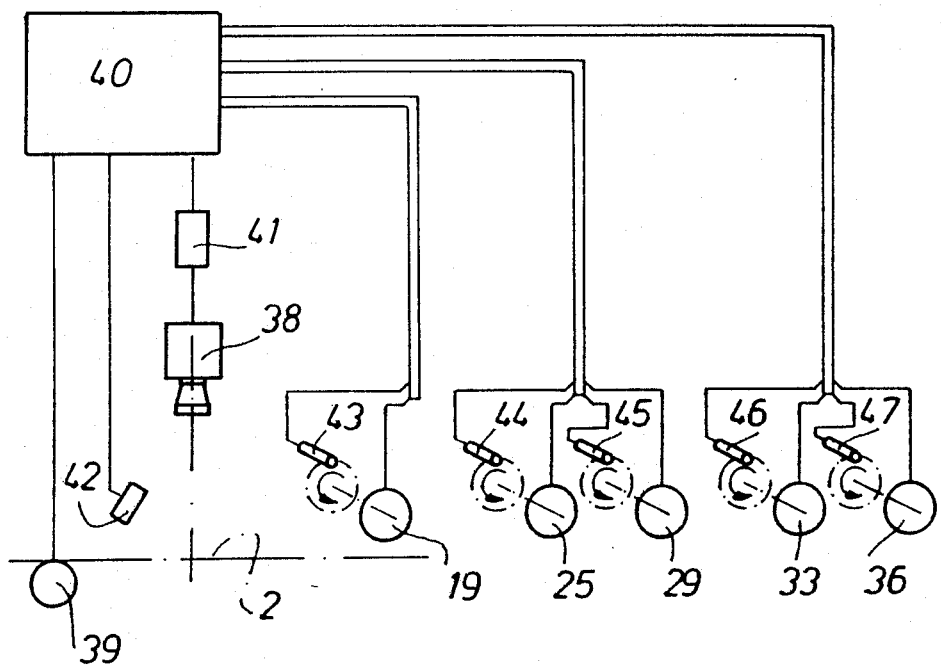
FIG. 4 shows a block diagram of a circuit suitable for controlling the drives for the cutting members.

The cutting mechanism according to the invention functions as follows:

A fish fillet 50 to be divided is, for example, placed manually on the conveying surface 2 in such a way that it engages the abutment rail 5 with its tail end 51 and comes to rest with its longitudinal axis substantially perpendicular to the conveying direction of the conveying surface 2. In this way, the fish fillet 50 first passes into the field of view of the video camera 38, which transmits an image of the fillet 50 to the computer 40, which carries out an evaluation or computation of the image on the basis of dimensions and/or prominent features. Before the fish fillet 50 enters the processing area of cutting mechanism 1, the knives 22 and 30, located in the passage position defined by the circle segments or cut-outs and shown in FIG. 2, are brought into the cutting position, computed and determined in accordance with a preselectable cutting programme, by means of the setting drives 29, 36. In accordance with this programme, the knives 22 and 30, as well as the axially stationary knife 18 which is also in the passage position, are then rotated into the initial cutting position or left in the passage position, (FIG. 2). When the fillet 50 enters the processing or operating area of the cutting mechanism 1, the knives in the cutting position are activated, so that, in accordance with the selected programme, the fillet 50 is divided up into pieces defined as a tail (portion) 52, a loin (portion) incorporating the dorsal muscle 53, and a centre piece 54. When the fillet passes out of the processing area of the cutting mechanism 1, the knives are rotated into the passage position shown in FIG. 2 and brought into their basic position, so that a new cycle can commence. The circular knife 12 permanently revolves independently of said cycle.

What is claimed is:

1. An apparatus for the automatic dividing of fish fillets defined by a front end and a tail end and extending along a longitudinal fillet axis, from which fillets preferably at least one of the pinbones and belly gills have been removed, for the purpose of gaining useable pieces defined by substantially parallel cut edges, such as so-called "tails" comprising at least a portion of the tail part, as well as so-called "loins" extending from said front end to said tail part and incorporating the dorsal muscle, the apparatus substantially comprising (a) conveying means driven in a revolving manner and defining a conveying surface conveying said fillets in a predetermined conveying direction in a position lying flat and subsfantially perpendicular to said longitudinal axis;

(b) a cutting mechanism above said conveying surface; and (c) an electronic camera system for detecting an image of the fillet and for the image-dependent control of the cutting mechanism, wherein said cutting mechanism includes cutting members in the form of circular knives each defining a cutting plane and a circumferential cutting edge, with which said knives are aligned essentially parallel to said conveying direction, at least part of said cutting members and thus their respective knives being associated to controlling means for controlling them with respect to their operating and cutting positions in dependency on at least one of the size of said fillets and prominent optical fillet features, and wherein said controllable circular knives are designed such that said circumferential cutting edge is provided with an interruption of its circumference by the removal of a portion of said circular circumference, the arc height of which removed portion corresponding at least to the maximum thickness of the largest fillet to be processed.

2. An apparatus as claimed in claim 1, wherein the cutting members revolve about a common axle.

3. An apparatus as claimed in claim 1, wherein said controlling means for each of said controllable cutting members comprise one rotary drive each, respectively, for controlling the operative position of said circular knives, at least part of said controllable cutting members being provided additionally with setting drive means for setting the cutting position of the respective knives.

4. An apparatus as claimed in claim 2, wherein said controlling means for each of said controllable cutting members comprise one rotary drive each, respectively, for controlling the operative position of said circular knives, at least part of said controllable cutting members being provided additionally with setting drive means for setting the cutting position of the respective knives.

5. An apparatus as claimed in claim 3, wherein said setting drive means and said rotary drives are designed as stepping motors.

6. An apparatus as claimed in claim 4, wherein said setting drive means and said rotary drives are designed as stepping motors.

7. An apparatus as claimed in claim 1, wherein means are provided for setting the cutting position of said cutting members for each fillet on the basis of a setting parameter defined by the total length of the respective fillet, said fillets being conveyed with the tail end thereof uniformly aligned.

8. An apparatus as claimed in claim 2, wherein means are provided for setting the cutting position of said cutting members for each fillet on the basis of a setting parameter defined by the total length of the respective fillet, said fillets being conveyed with the tail end thereof uniformly aligned.

9. An apparatus as claimed in claim 3, wherein means are provided for setting the cutting position of said cutting members for each fillet on the basis of a setting parameter defined by the total length of the respective fillet, said fillets being conveyed with the tail end thereof uniformly aligned.

10. An apparatus as claimed in claim 4, wherein means are provided for setting the cutting position of said cutting members for each fillet on the basis of a setting parameter defined by the total length of the respective fillet, said fillets being conveyed with the tail end thereof uniformly aligned.

11. An apparatus as claimed in claim 5, wherein means are provided for setting the cutting position of said cutting members for each fillet on the basis of a setting parameter defined by the total length of the respective fillet, said fillets being conveyed with the tail end thereof uniformly aligned.

12. An apparatus as claimed in claim 6, wherein means are provided for setting the cutting position of said cutting members for each fillet on the basis of a setting parameter defined by the total length of the respective fillet, said fillets being conveyed with the tail end thereof uniformly aligned.

13. An apparatus as claimed in claim 1, wherein means are provided for setting of the cutting position of at least the cutting member performing the loin cut by orientation according to the end of the cut used for removing at least one of the pinbones and belly flaps.

14. An apparatus as claimed in claim 2, wherein means are provided for setting of the cutting position of at least the cutting member performing the loin cut by orientation according to the end of the cut used for removing at least one of the pinbones and belly flaps.

15. An apparatus as claimed in claim 3, wherein means are provided for setting of the cutting position of at least the cutting member performing the loin cut by orientation according to the end of the cut used for removing at least one of the pinbones and belly flaps.

16. An apparatus as claimed in claim 4, wherein means are provided for setting of the cutting position of at least the cutting member performing the loin cut by orientation according to the end of the cut used for removing at least one of the pinbones and belly flaps.

17. An apparatus as claimed in claim 5, wherein means are provided for setting of the cutting position of at least the cutting member performing the loin cut by orientation according to the end of the cut used for removing at least one of the pinbones and belly flaps.

18. An apparatus as claimed in claim 1, wherein said conveying surface is provided with longitudinal grooves, which are adapted to receive said circumferential cutting edges of said circular knives in an immersing manner.

19. An apparatus as claimed in claim 3, wherein said conveying surface is provided with longitudinal grooves, which are adapted to receive said circumferential cutting edges of said circular knives in an immersing manner.

20. An apparatus as claimed in claim 19, wherein means are provided for setting said cutting position of said position-controllable cutting members by taking account of the position of said longitudinal grooves.

* * * * *